Oct. 30, 1934.  C. F. ADAMS  1,979,089
CUP DROPPING MACHINE
Filed Feb. 19, 1934  2 Sheets-Sheet 2
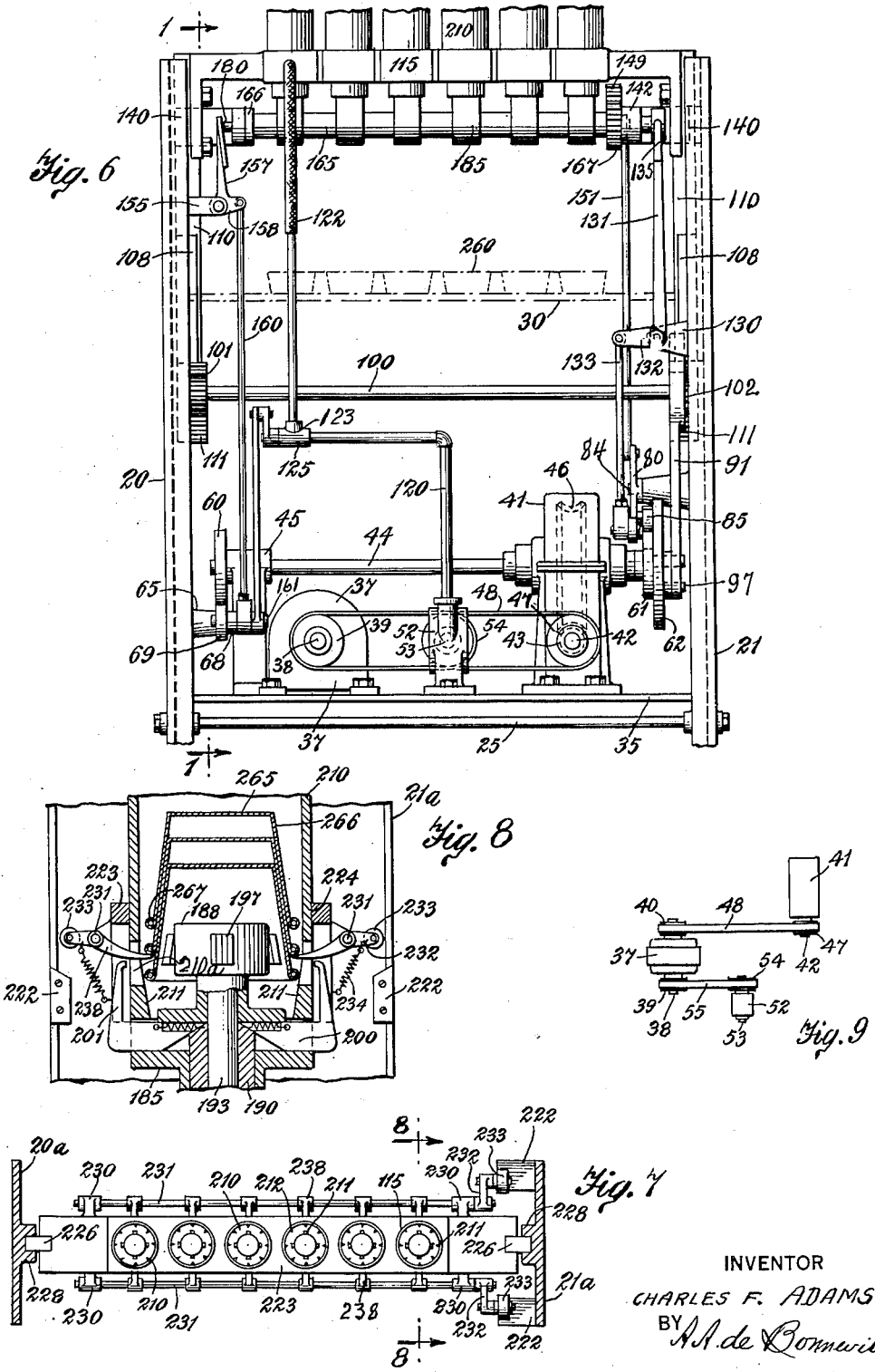

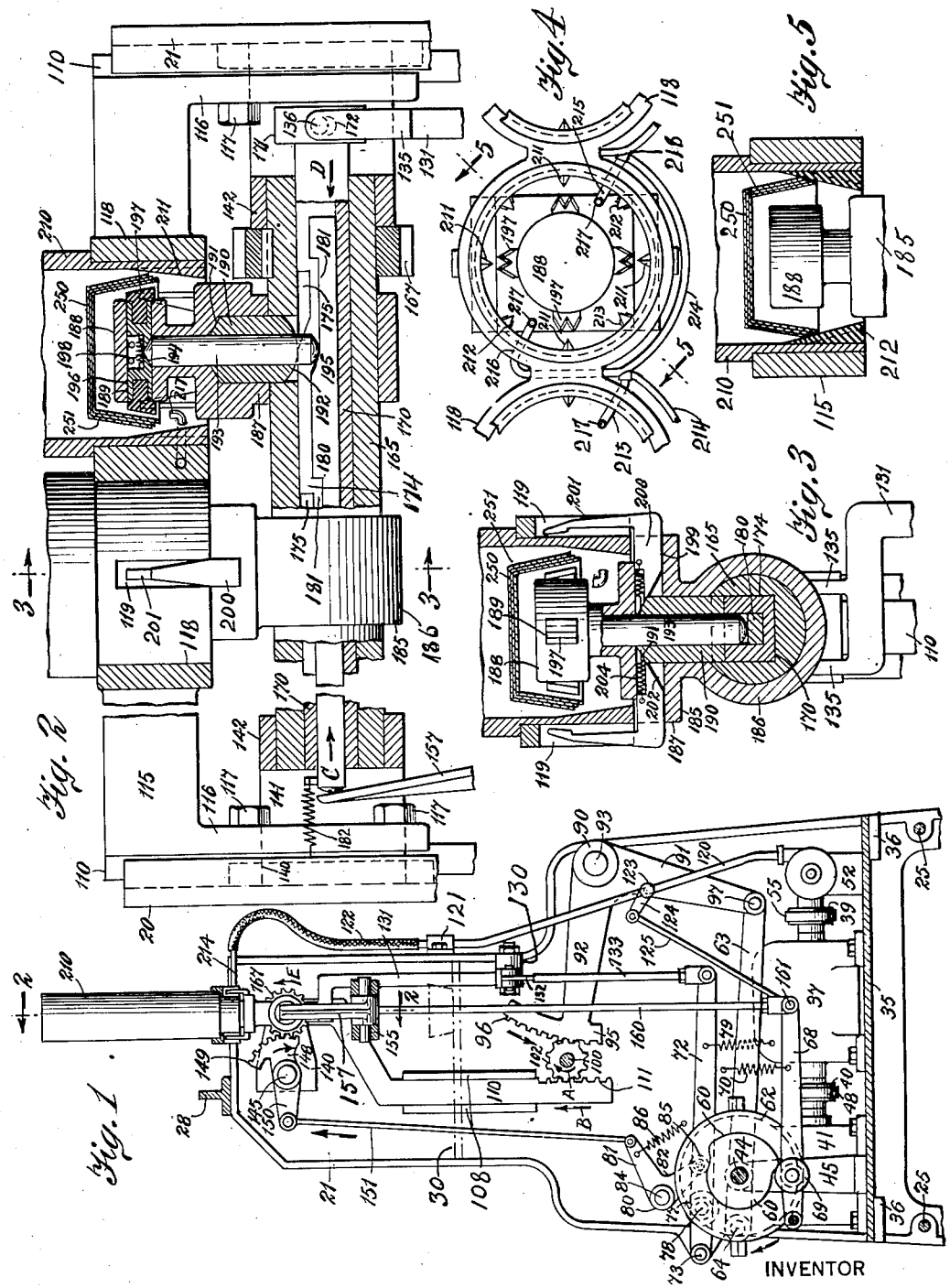

Patented Oct. 30, 1934

1,979,089

UNITED STATES PATENT OFFICE 1,979,089

CUP DROPPING MACHINE

Charles F. Adams, New York, N. Y.

Application February 19, 1934, Serial No. 711,890

7 Claims. (Cl. 214—8.5)

This invention relates to a cup dropping machine and is an improvement of my invention described in my application filed March 3rd, 1932, Serial Number 596,561.

The object of the invention is the production of a machine wherewith a plurality of cups or other objects can be automatically separated from a plurality of them, to locate them in position for further treatment.

The second object of the invention is the production of a machine wherewith a plurality of drinking cups can be separated from each other, for dispensing the same.

Referring to the drawings, Fig. 1 represents a section as on the line 1, 1 of Fig. 6 of an exemplification of the invention; Fig. 2 shows a partial enlarged right hand view and partial enlarged section of Fig. 1 on the line 2, 2; Fig. 3 is a section of Fig. 2 on the line 3, 3; Fig. 4 indicates a partial top view of Fig. 2; Fig. 5 represents a section of Fig. 4 on the line 5, 5; Fig. 6 shows a right hand side view of Fig. 1; Fig. 7 shows a partial top view of Fig. 6 with a portion in section and a modification; Fig. 8 is an enlarged section of Fig. 7 on the line 8, 8 and Fig. 9 represents a top plan view of the driving appurtenances of the cup dropping machine.

The cup dropping machine in this instance comprises the side frames 20 and 21, shown partly broken away, connected by the spacer bolts 25. The upper ends of the side frames 20 and 21 are connected by the cross connecting bar 28. A cup supporting platform 30 indicated in dotted lines has its ends supported by side frames 20 and 21.

A platform 35 is supported and fastened to the lugs 36 extending from the side frames 20 and 21. An electric motor 37 is supported upon and fastened to the platform 35. An armature shaft 38 of the electric motor 37 has fastened thereto the pulleys 39 and 40. A housing is indicated at 41. A worm shaft 42 with a worm 43 has one end thereof journaled in the housing 41. A shaft 44 has one end journaled in the housing 41 and its other end is journaled in the bracket 45 supported on the platform 35. A worm wheel 46 is fastened to the shaft 44. The said worm wheel 46 is in mesh with the worm 43. A pulley 47 is fastened to the shaft 42. A belt 48 connects the pulleys 40 and 47.

An air pump 52 is supported on the platform 35. A shaft for the pump 52 is indicated at 53 and has fastened thereto the pulley 54. A belt 55 connects the pulleys 39 and 54.

At one end of the shaft 44 is fastened the cam 60, and at the other end of the said shaft 44 is fastened the combined cam 61, similar to the cam 60, and the disc 62. One end of the connecting rod 63 is pivoted to the disc 62, by means of the pivot 64. On a hub 65 extending from the side frame 20 is pivoted one end of the link 68, which latter has journaled thereto the roller 69 which coacts with the cam 60. A spring 70 has one end fastened to the link 68 and its other end is fastened to the side frame 20. A connecting rod 72 has one end pivoted to the side frame 21, by means of the pivot 73.

A roller 77 is journaled to the connecting rod 72 by means of the pin 78 and coacts with the cam 61. A spring 79 has one end fastened to the link 72 and its other end is fastened to the frame member 21. A bell crank 80 having the arms 81 and 82 is pivoted to the side frame 21 by means of the pivot 84. A roller 85 is journaled to the end of the arm 82. A spring 86 has one end fastened to the arm 81 and its other end is fastened to the side frame 21.

A bell crank 90 having the arms 91 and 92 is pivoted to the side frame 21 by means of the pivot 93. The arm 92 has integral with its end the gear segment 95 having the teeth 96. The arm 91 is pinned to the link 63 by means of the pin 97.

A cross shaft 100 has its ends journaled in the side frames 20 and 21. A pair of spur gears 101 and 102 are fastened to the cross shaft 100.

Pairs of vertical guide strips 108 extend from each of the side frames 20 and 21. A rack bar 110 having the rack teeth 111 is guided in each pair of the guide strips 108. The gear 102 meshes with the teeth 96 of the gear segment 95 and with the teeth 111 of one of the rack bars. The gear 101 meshes with rack teeth 111 of the other rack bar 110. To the upper ends of the rack bars 110 is fastened the reciprocating head supporting bar 115 having the vertical legs 116. The legs 116 are fastened to the rack bars 110 by means of the bolts 117. The supporting bar 115 has integral therewith a plurality of circular seats 118 having the clearance openings 119.

Blast piping 120 extends from the outlet end of the air pump 52 and has its upper end fastened to the side frame 20 by means of the clamp 121. A flexible tube 122 has its lower end connected to upper end of the blast piping 120. To the blast piping 120 is fitted a valve 123 having the arm 124. The arm 124 and the link 68 are connected by the link 125.

A bracket 130 extends from the side frame 21 and has pivoted thereto the bell crank having the long arm 131 and the short arm 132. A link 133 has one end pinned to the arm 132 and its other end is pinned to the connecting rod 72. A bifurcated end 135 is integral with the upper end of the long arm 131. Pins 136 extend from the bifurcated end 135. A pair of brackets are each indicated with the foot 140 from which extends the member 141 that terminates in the annular bearing 142. From one of the feet 140 extends the pivot 145. A gear segment 148 is indicated having the teeth 149 at one end, and the arm 150 at its other end. The said gear segment is pivoted on the pivot 145. A link 151 has its ends pinned to the arm 150 and the arm 81.

A bifurcated bracket 155 extends from the side frame 20 and has pivoted thereto the bell crank having the arms 157 and 158. The arm 158 is pinned to the upper end of the connecting rod 160. The lower end of the connecting rod 160 is pinned to the link 68 by means of the pin 161.

In the annular bearings 142 is journaled the tubular shaft 165, which at one end has fastened thereto the collar 166, and adjacent to the other end is fastened the spur gear 167. The teeth of the spur gear 167 are in mesh with the teeth 149 of the gear segment 148.

In the tubular shaft 165 is slidably positioned the rectangular U shaped controlling bar designated in its entirety by the numeral 170. A cylindrical head 171 having the vertical slots 172 is integral with one end of the bar 170. The controlling bar 170 is indicated with the side walls 174 in which are indicated the guide openings 175. A second controlling bar 180 is positioned in the controlling bar 170 and has indicated therein a plurality of guide openings 181. A spring 182 has one end fastened to the controlling bar 180 and its other end is fastened to the side frame 20.

A plurality of cup supporting heads are each indicated in its entirety by the numeral 185. Each cup supporting head comprises the annular lower portion 186, which is fastened to the tubular shaft 165. The body portion of each head 185 is indicated at 187, from which extends the head per-se 188. In each head 188 are indicated the pairs of guide openings 189 at right angles to each other. A sliding block 190 having the beveled top end 191 and the curved bottom end 192 is indicated in each of the heads 185, and the lower ends of the blocks 190 coact with the upper edges of the side walls 174 and the guide openings 175. In each of the heads 185 is indicated the operating plunger 193 having the upper tapered end 194 and the lower curved end 195. The lower ends 195 coact with the guide openings 181.

In each pair of openings 189 are positioned a pair of supporting blocks 196, to each of which is secured a flexible gripping finger 197. Each pair of the blocks 196 is connected by a spring 198.

In guide openings 199 of each body portion 187 are slidably positioned a pair of grippers, each comprising the body portion 200 and the gripping finger 201. The body portions 200 have the beveled ends 202, which are adapted to bear against the faces of the beveled top ends 191 of the sliding blocks 190. The fingers 201 are indicated in the clearance openings 119. Springs 204 connect the body portions 200 and the block 190.

In each circular seat 118 of the supporting bar 115 is tightly secured the lower end of a cup supply cylinder 210. On the inner face of the lower end of each cup supply cylinder 210 are indicated the four tapered metallic fingers 211, and the four fingers 212 of flexible material, like rubber. The latter fingers 212 are held in the clips 213 extending from the cylinder 210. Openings 210a are indicated in the lower ends of the cylinders 210.

Adjacent to the lower portion of each supply cylinder 210 is supported in the circular seat 118, the circular shaped blast pipe 214, having the straight members 215 and 216 with the outlet ends 217. One of the blast pipes 214 connects with the tube 122 (Fig. 1) and the pipes 214 are connected to each other as indicated at 218.

Referring to the modification indicated in Figs. 7 and 8, the blast piping 120 with its appurtenances are omitted. The side frames are indicated at 20a and 21a. The frame 21a has connected thereto the stop lugs 222. A reciprocating head supporting bar 223 having the clearance openings 224, has projecting from its ends the guide strips 226, which are guided in the guides 228 integral with the side frames 20a and 21a. The supporting bar has integral therewith at its opposite sides the journal brackets 230. An oscillating rod 231 is journaled in the brackets 230. Cranks 232 have each one end thereof fastened to the oscillating rods 231. At the outer end of each crank 232 is journaled a roller 233. A spring 234 for each crank 232 has one end fastened thereto and its other end is fastened to the supporting bar 223.

To each of the rods 231 are fastened a plurality of separating fingers 238. The cup supporting cylinders are again indicated at 210, and are supported in the head supporting bar 223. In the lower end of each cup supply cylinder 210 are provided the metallic fingers 211 and the flexible fingers 212. The cup supporting heads are again indicated at 185, each with its sliding block 190. The grippers are again shown with their body portions 200 and the gripping fingers 201. The head per-se is again shown at 188 with its flexible gripping fingers 197. The operating plunger is again shown at 193.

To operate the cup dropping machine, and referring to Figs. 1 to 6 inclusive, the cup supply cylinders 210 are turned to their lowest positions as indicated in the drawings, by means of the rack bars 110, through the intervention of the gears 101 and 102, the bell crank 90, the connecting rod 63, the disc 62, the shaft 44, the worm wheel 46 and the worm 43. The latter is turned by the armature shaft 38 through the belt 48. The paper cups having the bottom walls 250 and the side walls 251, which latter may be smooth or corrugated, are positioned in inverted position one over the other, in the cup supply cylinders 210. The lower open ends of the walls 251 of a few of the cups bear against the metallic fingers 211 and the fingers 212 of flexible material. The electric motor 37 is started and the belt 48 transmits the rotations of the armature shaft 38 to the worm shaft 42, whereby the worm 43 and worm wheel 46 are turned. The shaft 44 turns with the worm wheel 46. The disc 62 turns with the shaft 44. The connecting rod 63 swings forward and back, and the bell crank 90 is swung. The gear segment 95 meshing with the gear 102 causes it to turn in the direction of the arrow A, Fig. 1, when the arm 92 is swinging down. The spur gear 101 is simultaneously turned in the same direction with the gear 102. By this means the rack bars 110 rise in the direction of the arrow B, Fig. 1, and the reciprocating head supporting bar 115 rises.

The cup supply cylinders 210 are thereby raised from the cup supporting heads 185. The ends of the side walls 251 of the cups are brought into contact with the metallic fingers 211 and the flexible fingers 212. By this means the walls 251 are somewhat collapsed at their lower portions.

At the same time the flexible gripping fingers 197 are spread. This is accomplished by the rotations of the cam 60 on the shaft 44 contacting with the roller 69 of the link 68, whereby the latter is oscillated. The oscillations of the link 68 are transmitted to the connecting rod 160, and the latter swings the bell crank arm 158, whereby the bell crank arm 157 is swung.

By this means the second controlling bar 180 is moved in the direction of the arrow C, Fig. 2, and the coaction of the guide openings 181 and the operating fingers 193 will raise the latter and spread the flexible fingers 197. The latter will thereby bear against the inner face of the wall 251 of the lowermost cup.

When the reciprocating supporting bar 115 rises, the controlling bar 170 is moved in the direction of the arrow D, Fig. 2, by reason of the swing of the bell crank arm 131, which lowers the sliding blocks 190 by the coaction of the guide openings 175, and the gripping fingers 201 are brought to bear against the outer face of the wall 251 of the lowermost cup, and the latter is thereby gripped between said fingers 201 and the fingers 197.

The controlling bar 170 is moved by the bell crank arm 131, which swings with the arm 132. The latter is actuated by the link 133. The link 133 is moved by the connecting rod 72 by virtue of its roller 77 coacting with the cam 61. After the cup supply cylinders have been raised clear of the cup supporting heads 185, the tubular shaft 165 is turned and the heads 185 are revolved in the direction of the arrow E, Fig. 1, through an angle of 180 degrees, and the cups having the walls 251 are dropped into the pans 260 on the platform 30. This is accomplished by the spur gear 167, the gear segment 148, the link 151, the bell crank 80 and the cam 61. Just after the lowermost cups are deposited into the pans 260, blast issues from the outlet ends 217 of the blast pipes 214, which separates a few of the lowermost cups in the cylinders 210.

Referring to Figs. 7 and 8, instead of the cups having the bottom walls 250 and the side walls 251, drinking cups having the bottom walls 265, the side walls 266, and the flanges 267 at the open ends of the walls 266 are shown.

In this instance when the cup supply cylinders 210 rise, the separating fingers 238 engage the bottom faces of the flanges 267 and the lowermost drinking cup is separated from the others. The cups having the walls 266 are generally deposited on a platform.

The fingers 238 function when the cup supply cylinders begin to rise and the rollers 233 leave the stop lugs 222. The tension of the springs 234, swing the separating fingers 238 toward and below the flange 267 of the adjacent drinking cup and holds it and the stack of drinking cups above. As the head 210 continues to rise, the gripping fingers 201 engage the lowermost cup in conjunction with the flexible gripping fingers 197, as already described.

Attention is called to the fact that more than one row of cup supporting heads 185 with their appurtenances can be fastened to the tubular shaft 165. In such a case the supporting heads 185 are swung through smaller angles and thereby increase the speed of the distribution of the cups.

It is to be further noted that the cups having the bottom walls 250 instead of being round may be oval, polygonal or rectangular. In such cases the cup supply cylinders 210 and the cup supporting heads 185 are shaped to suit the form of the cups dispensed.

Having described my invention, I claim:

1. In a cup dropping machine the combination of a reciprocating head supporting bar, a cup supply cylinder for a stack of cups to be dispensed, supported in said supporting bar, fingers at the lower end of the inner surface of said cylinder, a tubular shaft journaled in the machine, a cup supporting head fastened to said shaft and adapted to enter said cup supply cylinder, gripping fingers carried by said supporting head, means to move said fingers, a pair of grippers slidably supported in the cup supporting head and a gripping finger integral with each gripper, the latter fingers coacting with gripping fingers of said supporting head to clamp the lowermost cup of said stack as the cup supply cylinder rises clear of said fingers.

2. In a cup dropping machine the combination of a reciprocating head supporting bar, a plurality of cup supply cylinders for stacks of cups to be dispensed, supported in said supporting bar, fingers at the lower end of the inner surface of each of said cylinders, a shaft journaled in the machine, cup supporting heads fastened to said shaft and adapted to enter said cup supply cylinders, gripping fingers carried by each supporting head, means to move said fingers, a pair of grippers slidably supported in each cup supporting head, a gripping finger integral with each gripper, means to move said grippers, the fingers of the grippers coacting with the gripping fingers of their supporting head to clamp the lowermost cup of each stack of cups as the cup supply cylinders rise clear of the fingers and means to produce a blast at the lower end of each stack of cups.

3. In a cup dropping machine the combination of a cup supporting head adapted to support a stack of cups to be dispensed, means to turn said head, a cup supply cylinder coacting with said cup supporting head, fingers at the lower end of the inner face of said cup supply cylinder to engage the lower portion of said stack of cups, fingers on said head adapted to engage the inner face of the lowermost cup of said stack, gripping fingers carried on said cup supporting head adapted to bear on the outer surface of the lowermost cup to be dispensed, said fingers and gripping fingers adapted to pinch said lowermost cup between them, and means to raise said cup supply cylinder when the lowermost cup of the stack is pinched to separate said lowermost cup from the stack of cups.

4. In a cup dropping machine the combination of a cup supporting head adapted to support a stack of cups to be dispensed, a cup supply cylinder coacting with said cup supporting head, means at the lower end of the inner face of said cup supply cylinder to engage the lower portion of said stack of cups, fingers supported in said head adapted to engage the inner face of the lowermost cup of said stack one after the other as the cups are dispensed, means to move said fingers against and from the inner face of the lowermost cup, gripping fingers slidably supported on said head adapted to bear against the outer surface of the lowermost cup, means to move said gripping fingers into and out of engagement with the lowermost cup of said stack, and means to move said cylinder relatively to said cup supporting head to separate the lowermost cups one after the other from said stack.

5. In a cup dropping machine the combination of a head supporting bar, a plurality of cup supply cylinders supported on said bar for stacks of cups to be dispensed, means to reciprocate said head supporting bar, a cup supporting head to support said stacks of cups coacting with each cup supply cylinder, gripping fingers slidably supported on each head adapted to bear against the inner face of the lowermost cup of each stack as said cups are dispensed, means to move said fingers against and from the inner face of the lowermost cup of each stack, gripping fingers slidably supported in each head, means to move said gripping fingers against and from the outer surface of the lowermost cup of each stack, separating fingers adapted to bear against the lower edge of a cup of each stack above the lowermost cup and means to swing said separating fingers.

6. In a cup dropping machine the combination of a pair of side frames, a pair of stop lugs extending from the inner face of one of said frames, a reciprocating head supporting bar having its ends guided in said frames, an oscillating rod journaled on each of the opposite sides of said supporting bar, a crank fastened to one end of each of said oscillating rods, a roller journaled to each of said cranks coacting with one of said stop lugs, a plurality of cup supply cylinders having their lower ends secured to said supporting bar, each cup supply cylinder having a pair of openings in its lower end, clearance openings in said supporting bar coacting with the openings in said cup supply cylinders, a cup supporting head adapted to be positioned in each cup supply cylinder and adapted to support a stack of cups, each having a flange at its lower end, fingers for each of said heads, separating fingers fastened to each oscillating rod for each cup supply cylinder, said separating fingers adapted to extend through the openings at the lower ends of the cup supply cylinders and adapted to bear up against the lower flanges of said cups, movable fingers for each cup supporting head adapted to bear against the inner face of the lowermost cups, a pair of grippers slidably supported in each cup supporting head and a gripping finger integral with each gripper, the gripping fingers coacting with the movable fingers of each cup supply supporting head to grip the cups one after the other.

7. In a cup dropping machine the combination of a pair of side frames, a pair of stop lugs extending from the inner face of one of said frames, a reciprocating head supporting bar guided between said frames, an oscillating rod journaled on each of the opposite sides of said supporting bar, means interposed between said stop lugs and said oscillating rods to oscillate the latter, a plurality of cup supply cylinders having openings in their lower ends secured to said bar, clearance openings in said bar coacting with the openings in said cup supply cylinders, said cylinders each adapted to support a stack of cups, said cups each having a flange at its lower end, separating fingers fastened to each oscillating rod for each cup supply cylinder adapted to bear up against the lower flanges of said cups, fingers supported in each cup supporting head to bear against said cups at their inner faces, and means in the supporting heads coacting with the fingers thereof to grip said cups one after the other as the reciprocating head supporting bar rises.

CHARLES F. ADAMS.